(12) United States Patent
Lindsay (10) Patent No.: US 11,346,260 B2
(45) Date of Patent: May 31, 2022

(54) ROCKER SUPPORT BOLT BUSHING

(71) Applicant: John P. Lindsay, Brentwood, CA (US)

(72) Inventor: John P. Lindsay, Brentwood, CA (US)

( * ) Notice: Subject to any disclaimer, the term of this patent is extended or adjusted under 35 U.S.C. 154(b) by 0 days.

(21) Appl. No.: 17/068,687

(22) Filed: Oct. 12, 2020

(65) Prior Publication Data
US 2021/0025296 A1 Jan. 28, 2021

Related U.S. Application Data

(63) Continuation-in-part of application No. 15/225,596, filed on Aug. 1, 2016, now abandoned.

(60) Provisional application No. 62/358,031, filed on Jul. 3, 2016, provisional application No. 62/310,791, filed on Mar. 20, 2016, provisional application No. 62/272,070, filed on Feb. 22, 2016, provisional application No. 62/278,413, filed on Jan. 13, 2016, provisional application No. 62/276,866, filed on Jan. 10, 2016, provisional application No. 62/276,821, filed on Jan. 8, 2016, provisional application No. 62/275,210, filed on Jan. 5, 2016, provisional application No. 62/284,859, filed on Oct. 13, 2015, provisional application No. 62/200,017, filed on Aug. 1, 2015.

(51) Int. Cl.
*F01L 1/46* (2006.01)
*F01L 1/18* (2006.01)
*F16C 17/02* (2006.01)

(52) U.S. Cl.
CPC .................................. *F01L 1/46* (2013.01); *F01L 1/18* (2013.01); *F16C 17/02* (2013.01); *F16C 2360/22* (2013.01)

(58) Field of Classification Search
CPC ..... F01L 1/46; F01L 1/18; F01L 17/02; F01L 2303/00; F01L 2810/04; F16C 2360/22; F16C 33/04; F16C 17/02; Y10T 16/05
USPC .......................................... 16/2.1; 123/90.39
See application file for complete search history.

(56) References Cited

U.S. PATENT DOCUMENTS

| 1,480,485 | A | * | 1/1924 | Yonce | F16B 19/1027 |
| | | | | | 411/354 |
| 1,801,549 | A | * | 4/1931 | Frederickson | H01B 17/58 |
| | | | | | 174/83 |
| 1,829,512 | A | * | 10/1931 | Frederickson | H02G 3/02 |
| | | | | | 174/83 |
| 2,497,251 | A | * | 2/1950 | Wolf | H01B 17/14 |
| | | | | | 174/151 |
| 2,625,639 | A | * | 1/1953 | Mallett | B23K 11/366 |
| | | | | | 219/84 |
| 2,634,142 | A | * | 4/1953 | Cernea | B21J 13/06 |
| | | | | | 403/24 |
| 2,991,065 | A | * | 7/1961 | Jewell | B60G 5/047 |
| | | | | | 267/247 |
| 3,150,886 | A | * | 9/1964 | Briegel | H02G 3/0616 |
| | | | | | 285/149.1 |
| 3,298,725 | A | * | 1/1967 | Boteler | F16B 19/02 |
| | | | | | 403/282 |

(Continued)

*Primary Examiner* — William L Miller
(74) *Attorney, Agent, or Firm* — West & Associates, A PC; Stuart J. West; Charlotte Rodeen-Dickert (57) ABSTRACT

A metallic bushing that deforms under a force applied substantially parallel to its central longitudinal axis and then expands radially to take up the gap between a support bolt and a rocker arm shaft in an internal combustion engine in order to eliminate unwanted motion and subsequent excess engine noise.

10 Claims, 8 Drawing Sheets

(56) References Cited

U.S. PATENT DOCUMENTS

| | | | | |
|---|---|---|---|---|
| 3,603,626 | A * | 9/1971 | Whiteside | F16B 35/041 |
| | | | | 403/408.1 |
| 4,338,036 | A * | 7/1982 | DeLeu | F16D 1/096 |
| | | | | 403/16 |
| 4,520,984 | A * | 6/1985 | Rouleau | G09F 7/22 |
| | | | | 248/317 |
| 4,762,310 | A * | 8/1988 | Krajewski | B60G 7/02 |
| | | | | 267/141.2 |
| 5,123,384 | A * | 6/1992 | Abbas | F01L 1/183 |
| | | | | 123/90.39 |
| 5,255,647 | A * | 10/1993 | Kiczek | F02F 7/006 |
| | | | | 123/195 C |
| 5,980,174 | A * | 11/1999 | Gallagher | F16B 5/01 |
| | | | | 29/897.32 |
| 6,041,747 | A * | 3/2000 | Kotani | F01L 1/181 |
| | | | | 123/90.39 |
| 7,717,659 | B2 * | 5/2010 | Lang | F16B 4/004 |
| | | | | 411/533 |
| 7,823,822 | B2 * | 11/2010 | Raymond | D21D 1/30 |
| | | | | 241/298 |
| 8,613,265 | B2 * | 12/2013 | Maruyama | F01L 1/185 |
| | | | | 123/90.13 |
| 2002/0092491 | A1 * | 7/2002 | Kotani | F01L 1/185 |
| | | | | 123/90.45 |
| 2010/0064845 | A1 * | 3/2010 | French | B62M 3/003 |
| | | | | 74/594.2 |
| 2011/0049834 | A1 * | 3/2011 | Natu | F16C 33/201 |
| | | | | 280/279 |
| 2018/0010489 | A1 * | 1/2018 | Jones | F01L 1/46 |
| 2019/0242437 | A1 * | 8/2019 | Powers | F16H 57/0025 |

\* cited by examiner

ROCKER SUPPORT BOLT BUSHING

CROSS REFERENCE TO RELATED APPLICATIONS

This application is a continuation-in-part of prior-filed and co-pending U.S. patent application Ser. No. 15/225,596, filed Aug. 1, 2016 by John P. Lindsay which claims priority under 35 U.S.C. § 119(e) from prior-filed U.S. Provisional Application Ser. No. 62/200,017, filed Aug. 1, 2015; Ser. No. 62/284,859, filed Oct. 13, 2015; Ser. No. 62/272,070, filed Dec. 29, 2015, Ser. No. 62/275,210, filed Jan. 5, 2016; Ser. No. 62/276,821, filed Jan. 8, 2015; 62/276,866, filed Jan. 10, 2016; Ser. No. 62/278,413, filed Jan. 13, 2016; Ser. No. 62/310,791, filed Mar. 20, 2016; Ser. No. 62/358,031, filed Jul. 3, 2016, the entirety of each of which is hereby incorporated herein by reference.

BACKGROUND

Technical Field

The present device is in the field of internal combustion engines, particularly the valve train components of such engines.

SUMMARY

In a typical motorcycle engine, for example, the rocker assembly includes a rocker arm support that holds a rocker arm shaft. A rocker support bolt secures the rocker arm support and also cross-pins the rocker arm shaft in place. However, in some engines, there can be excessive clearance between the rocker support bolt and the rocker arm shaft. This can cause a loud tapping noise at higher rpms.

A round bushing placed on the rocker support bolt can take up this space and eliminate the tapping caused by the rocker arm shaft hitting the bolt. However, some bushings can be compressed and deformed during installation rather than push down into the hole. Although bushings made of more malleable materials can have the advantage of compressing during installation and then restoring to a relaxed state to expand and fill the space, they, too, can be subject to undesirable deformation on installation. Further the rocker support plate can have a casting parting ring around the circumference of the hole, which can increase the flaring problem. This can lead to problems of alignment and valve train geometry.

Substantially cylindrical bushings can address this issue, but must be precisely machined to fit both bolts and rocker plate holes, which can be expensive to produce. Non-cylindrical bushings, though, can fit a wide variety of bolt/plate combinations. What is needed is an improved bushing for a rocker support bolt to properly align and lock the rocker arm shaft, that is easy to install and can fill the clearance space while withstanding temperatures of engine operation

BRIEF DESCRIPTION OF THE DRAWINGS

Further details of the present device are explained with the help of the attached drawings in which:

FIG. 1b depicts an exploded side view of the rocker arm support assembly shown in FIG. 1a.

FIG. 1c depicts a detail cutaway side view of the support bolt insertion point on the rocker arm support assembly shown in FIG. 1a.

FIG. 2b depicts a perspective view of an alternate embodiment of the present device as shown in FIG. 2a.

FIG. 3b depicts a perspective view of an alternate embodiment of the present device as shown in FIG. 3a.

FIG. 4b depicts a perspective view of an alternate embodiment of the present device shown in FIG. 4a.

FIG. 5b depicts a perspective view of an alternate embodiment of the present device shown in FIG. 5a.

FIG. 6b depicts a perspective view of an alternate embodiment of the present device shown in FIG. 6a.

FIG. 7b depicts a perspective view of an alternate embodiment of the present device shown in FIG. 7a.

FIG. 8b depicts a perspective view of an alternate embodiment of the present device shown in FIG. 8a.

FIG. 9b depicts a perspective view of an alternate embodiment of the present device shown in FIG. 9a.

FIG. 10b depicts a perspective view of an alternate embodiment of the present device shown in FIG. 10a.

DETAILED DESCRIPTION

Figure 1A:
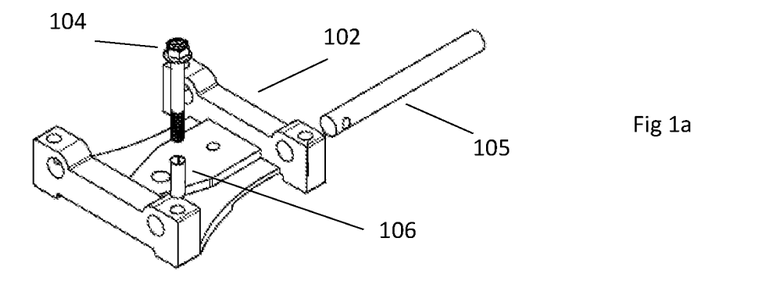
FIG. 1a depicts an exploded perspective view of a rocker arm support assembly of a typical engine.

FIG. 1a depicts an exploded perspective view of a rocker arm support assembly of an engine. A rocker arm support 102 can have a plurality of bolts 104 securing a rocker arm support 102 and a rocker arm shaft 105. As shown in FIG. 1a, some embodiments of the present device can be a bushing 106 having an inner surface and an outer surface, and a distal end and a proximal end. In some embodiments the inner diameter of a bushing 106 can be such to selectively engage longitudinally with a bolt 104 passing through it, but in other embodiments can be any other known and/or convenient diameter. In the embodiment shown in FIG. 1a, a bushing 106 can be substantially cylindrical, or have a substantially longitudinally constant outer diameter, but in other embodiments can have a longitudinally varying outer diameter. In some embodiments a bushing 106 can be fabricated from steel or any other known and/or convenient material, and can be hardened, spring-tempered, or subject to any other known and/or convenient process. In some embodiments, a spring-tempered material can be advantageous to maintain device performance during heat expansion.

Figure 1B:
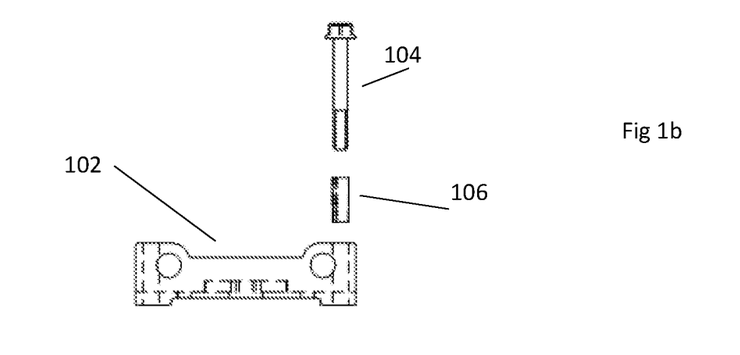

FIG. 1b depicts an exploded side view of the rocker arm support assembly shown in FIG. 1a. In some embodiments, a bolt 104 can pass through a bushing 106, where they can selectively engage into a designated hole in a rocker arm support 102.

Figure 1C:
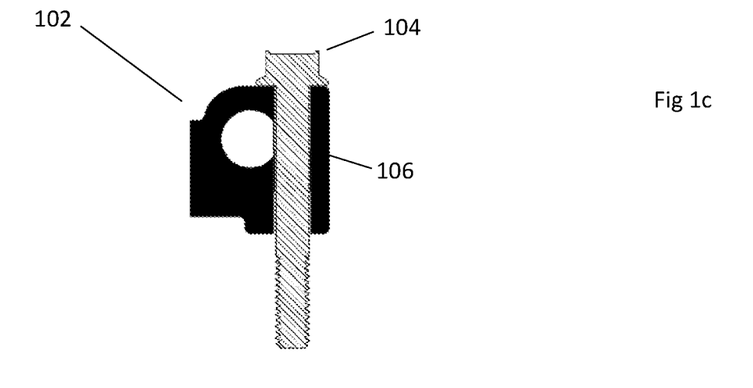

FIG. 1c depicts a detail cutaway side view of the support bolt insertion point on the rocker arm support assembly shown in FIG. 1a. As a bolt 104 engages with a rocker arm support 102, a bolt 104 can also align with a notch in a rocker arm shaft 105, locking it in place. In some embodiments, a bushing 106 can occupy the clearance space between a bolt 104, a rocker arm support 102, and a rocker arm shaft 105, thereby tightening the fit.

Figure 2A:
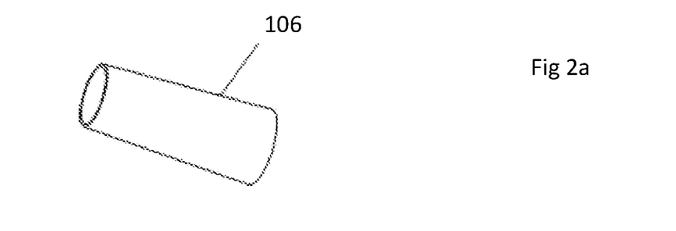
FIG. 2a depicts a perspective view of one embodiment of the present device.

In the embodiment shown in FIG. 2a, a bushing 106 can have sections of longitudinally varying outer diameter. In some embodiments, the distal end of a bushing 106 can have an outer diameter less than that of the proximal end. As shown in FIG. 2a, a bushing 106 can have a tapered geometry, but in other embodiments can have any other known and/or convenient geometry.

Figure 2B:
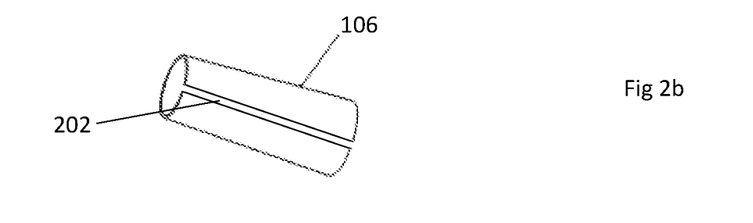

FIG. 2b depicts an alternate embodiment of the present device as shown in FIG. 2a, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 3A:
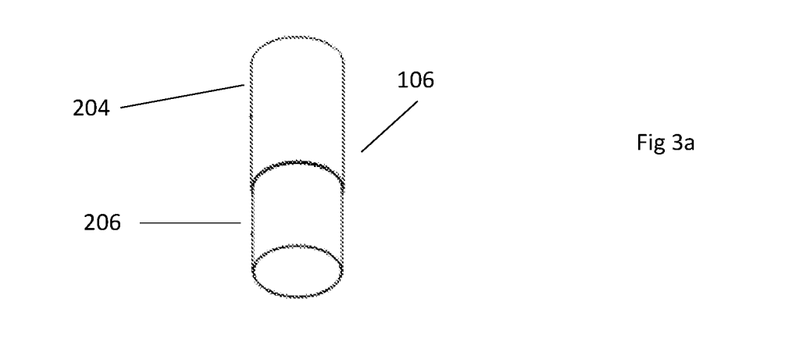
FIG. 3a depicts a perspective view of one embodiment of the present device.

FIG. 3a depicts another embodiment of the present device in which a bushing 106 can have sections of longitudinally varying diameter. In the embodiment of FIG. 3a, a bushing 106 can have a first segment 204 with a larger diameter than that of at least one second segment 206. In some embodiments, a first segment 204 can be located at the proximal end of a bushing 106, with at least one second segment 206 at the distal end, but can have any other known and/or convenient configuration in other embodiments.

Figure 3B:
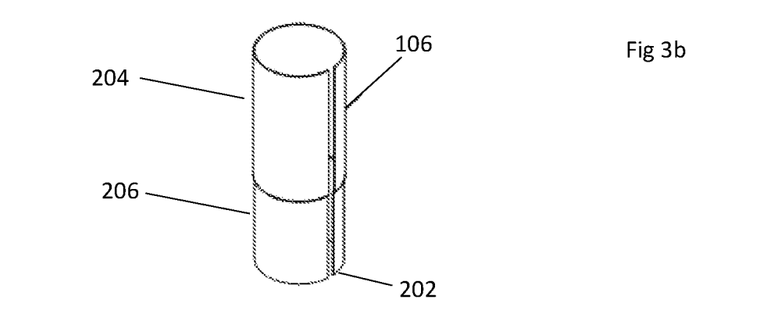

FIG. 3b depicts an alternate embodiment of the present device as shown in FIG. 3a, in which a bushing 106 can have a longitudinal slit 202. In some embodiments a longitudinal slit 202 can run along the entire length of a bushing 106, but in other embodiments can run longitudinally along any known and/or convenient segment of a bushing 106. In the embodiment shown in FIG. 3b, fabricating a bushing 106 from a spring-tempered material can improve device performance by allowing a bushing 106 to maintain pressure against a rocker arm shaft 105 even as a rocker assembly expands due to heat.

Figure 4A:
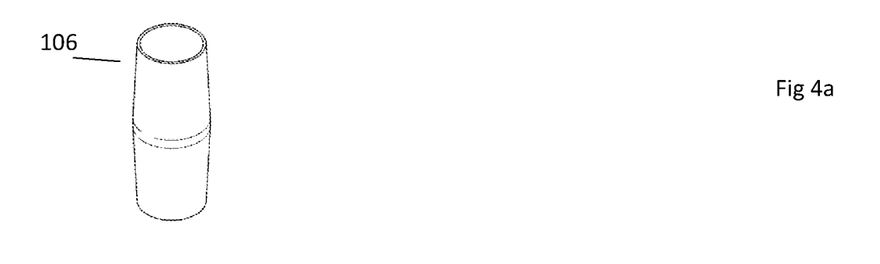
FIG. 4a depicts a perspective view of one embodiment of the present device.

FIG. 4a depicts a perspective view of another embodiment of the present device, in which a bushing 106 can have sections of longitudinally varying outer diameter. In some embodiments, the distal end and the proximal end of a bushing 106 can each have an outer diameter less than that of a region substantially at the longitudinal midpoint of a bushing 106. As shown in FIG. 4a, a bushing 106 can have a double-tapered geometry substantially symmetric about the longitudinal midpoint of a bushing 106, but in other embodiments can have any other known and/or convenient geometry.

Figure 4B:
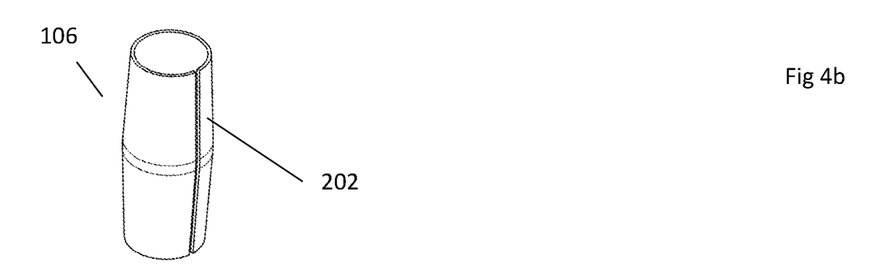

FIG. 4b depicts an alternate embodiment of the present device as shown in FIG. 4a, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 5A:
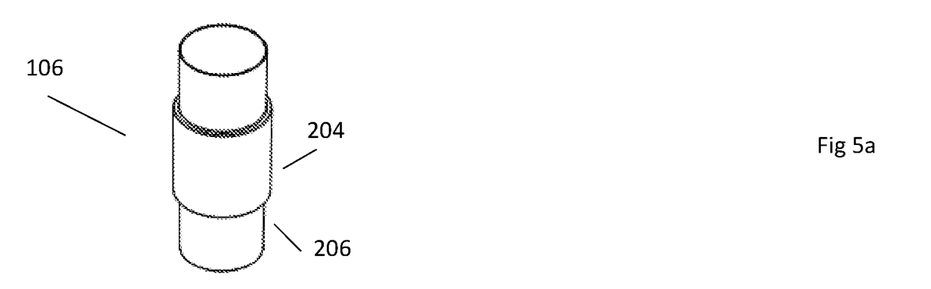
FIG. 5a depicts a perspective view of one embodiment of the present device.

FIG. 5a depicts another embodiment of the present device in which a bushing 106 can have sections of longitudinally varying diameter. In the embodiment of FIG. 5a, a bushing 106 can have a first segment 204 with a larger diameter than that of at least one second segment 206. In some embodiments, a first segment 204 can be located substantially at the longitudinal midpoint of a bushing 106, with a second segments 206 of at the proximal and the distal end, but can have any other known and/or convenient configuration in other embodiments. In some embodiments, second segments 206 can be of substantially equal length, but in other embodiments can be of any other known and/or convenient lengths.

Figure 5B:
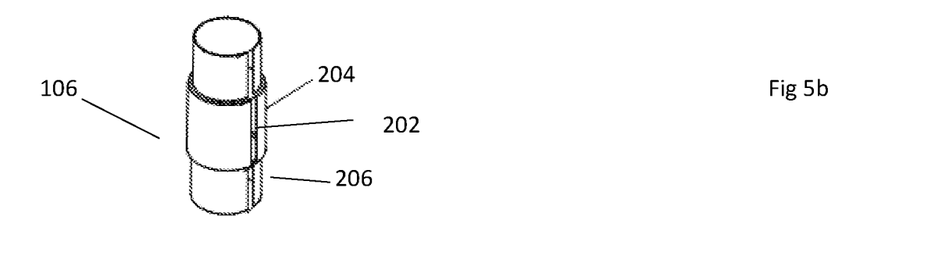

FIG. 5b depicts an alternate embodiment of the present device as shown in FIG. 5a, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 6A:
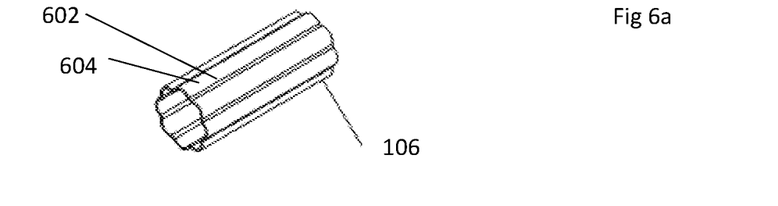
FIG. 6a depicts a perspective view of one embodiment of the present device.

FIG. 6a depicts a perspective view of another embodiment of the present device. In some embodiments, a bushing 106 can have a non-circular cross section with a plurality of longitudinal grooves 602 adjacent to longitudinal ridges 604. As shown in FIG. 6a, longitudinal grooves 602 and longitudinal ridges 604 can have rounded cross sections, but in other embodiments can have any other known and/or convenient cross-sectional geometry.

Figure 6B:
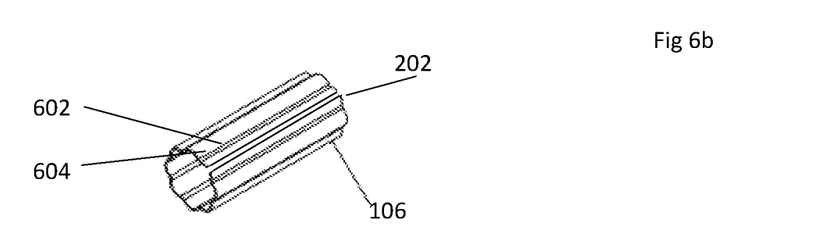

FIG. 6b depicts an alternate embodiment of the present device as shown in FIG. 6a, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 7A:
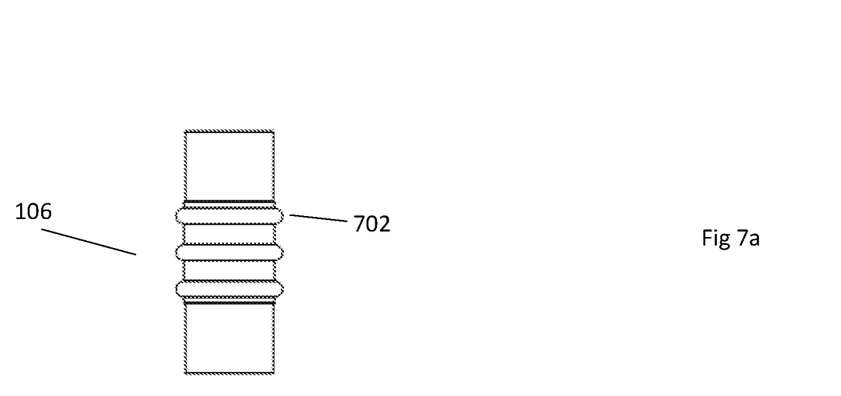
FIG. 7a depicts a perspective view of one embodiment of the present device.

As shown in FIG. 7a, other embodiments of the present device can have at least one portion of the outer surface extruded to form at least one circumferential ridge 702, which can be located substantially at the longitudinal midpoint of a bushing 106. However, circumferential ridges 702 can be located at any other known and/or convenient point on the outer surface of a bushing 106. In the embodiment of FIG. 7a, circumferential ridges 702 can have a rounded cross-section, but in other embodiments can have any other known and/or convenient cross-sectional geometry.

Figure 7B:
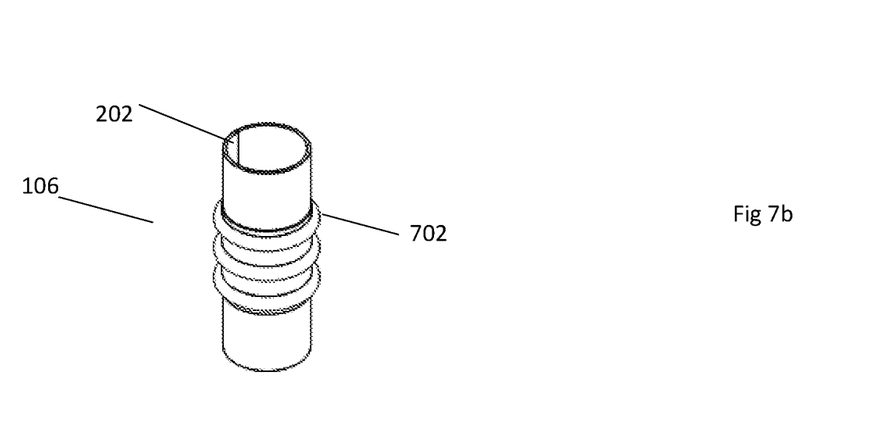

FIG. 7b depicts an alternate embodiment of the present device as shown in FIG. 7a, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 8A:
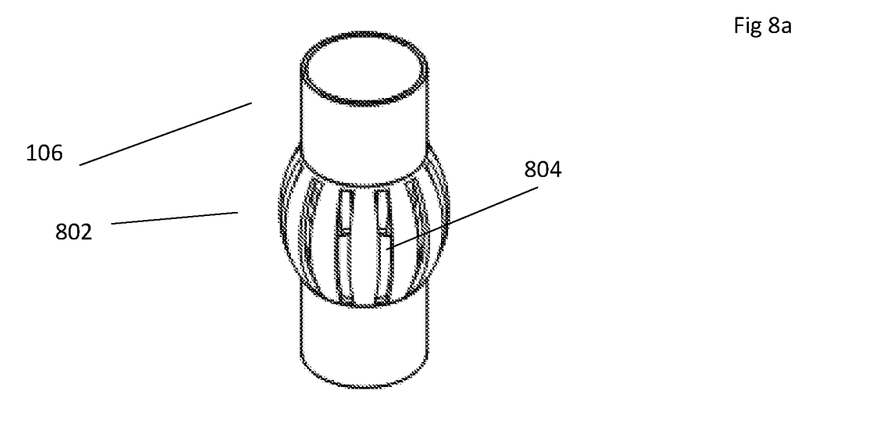
FIG. 8a depicts a perspective view of one embodiment of the present device.

FIG. 8a depicts another embodiment of the present device. As shown in FIG. 8a, a bushing 106 can have a segment 802 with a plurality of longitudinal slots 804. In some embodiments, a segment 802 can be extruded radially such that the surfaces of a bushing 106 radially adjacent to longitudinal slots 804 bulge outward. As shown in FIG. 8a, a segment 802 can have a bulbous configuration, but in other embodiments can have any other known and/or convenient geometry.

Figure 8B:
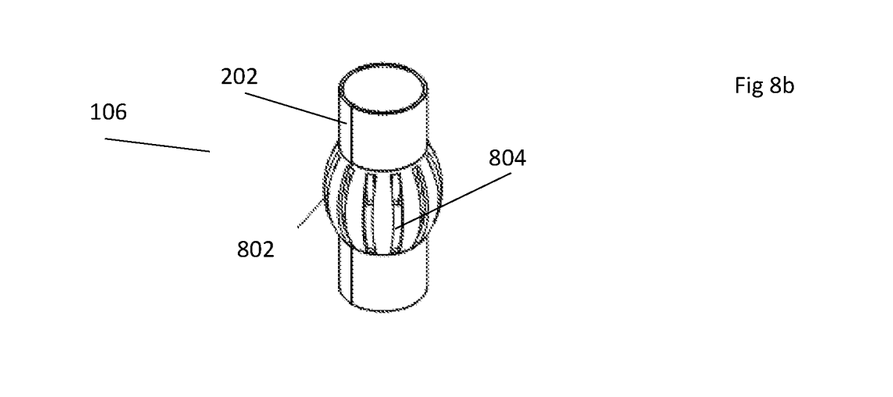

FIG. 8b depicts an alternate embodiment of the present device as shown in FIG. 8a, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 9A:
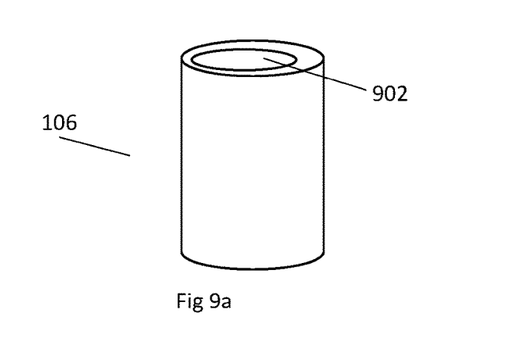
FIG. 9a depicts a perspective view of one embodiment of the present device.

FIG. 9a depicts another embodiment of the present device, in which a bushing 106 can have a circumferentially varying wall thickness. In such embodiments, the inner surface of a bushing 106 does not substantially align with the outer surface relative to the central longitudinal axis of a bushing 106. An opening 902 can be non-concentric with the outer surface of a bushing 106.

Figure 9B:
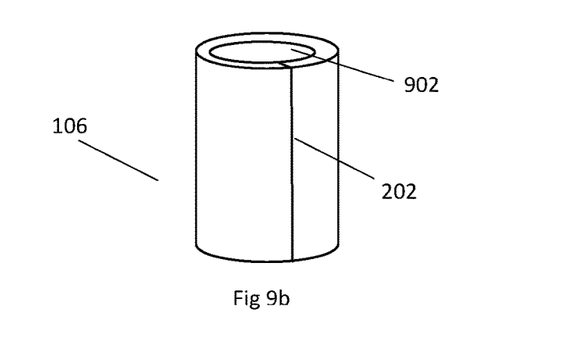

FIG. 9b depicts an alternate embodiment of the present device as shown in FIG. 9, in which a bushing 106 can have a longitudinal slit 202. In some embodiments a longitudinal slit 202 can run along the entire length of a bushing 106, but in other embodiments can run longitudinally along any known and/or convenient segment of a bushing 106.

Figure 10A:
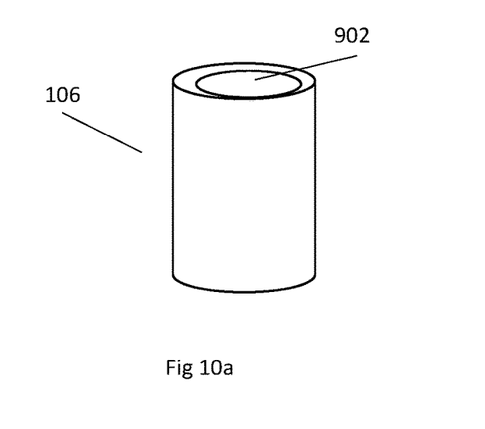
FIG. 10a depicts a perspective view of one embodiment of the present device.

FIG. 10a depicts another embodiment of the present device, in which a bushing 106 can have a circumferentially varying wall thickness. In such embodiments, the inner surface of a bushing 106 does not substantially align with the outer surface relative to the central longitudinal axis of a bushing 106. An opening 902 can be non-concentric with the outer surface of a bushing 106. As shown in FIG. 10a, this configuration can create a bushing 106 with a crescent-shaped cross-section.

Figure 10B:
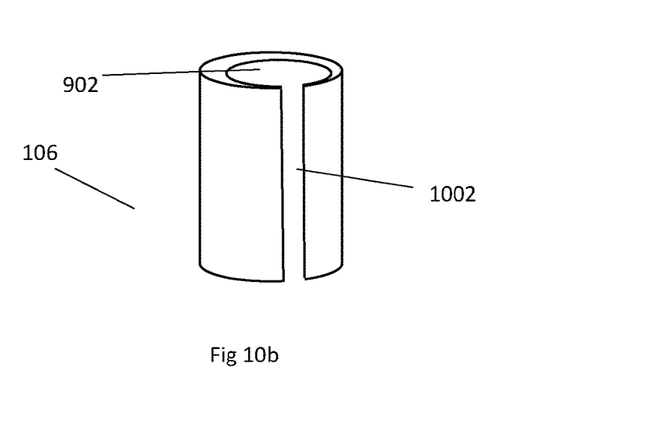

FIG. 10b depicts an alternate embodiment of the present device as shown in FIG. 10a, in which a bushing 106 having a crescent-shaped cross section can have a longitudinal gap 1002. In some embodiments a longitudinal gap 1002 can run along the entire length of a bushing 106, but in other embodiments can run longitudinally along any known and/or convenient segment of a bushing 106. A longitudinal gap 1002 can be located at the point of least thickness of the cross-section or at any other known and/or convenient location.

In use, a bushing 106 can be placed into a hole on a rocker arm support 102. A bolt 104 can be placed through a bushing 106 and then through a rocker arm support 102. Tightening down a bolt 104 can push a bushing 106 down into the hole, filling the clearance space between a bolt 104 and a rocker arm shaft 105. This can mitigate or eliminate the motion of a rocker arm shaft 105 against a bolt and the tapping sound that creates. In some embodiments, the present device can also dampen the sound of closing valves in the engine and decrease unwanted noise.

Figures 11A, 11B:
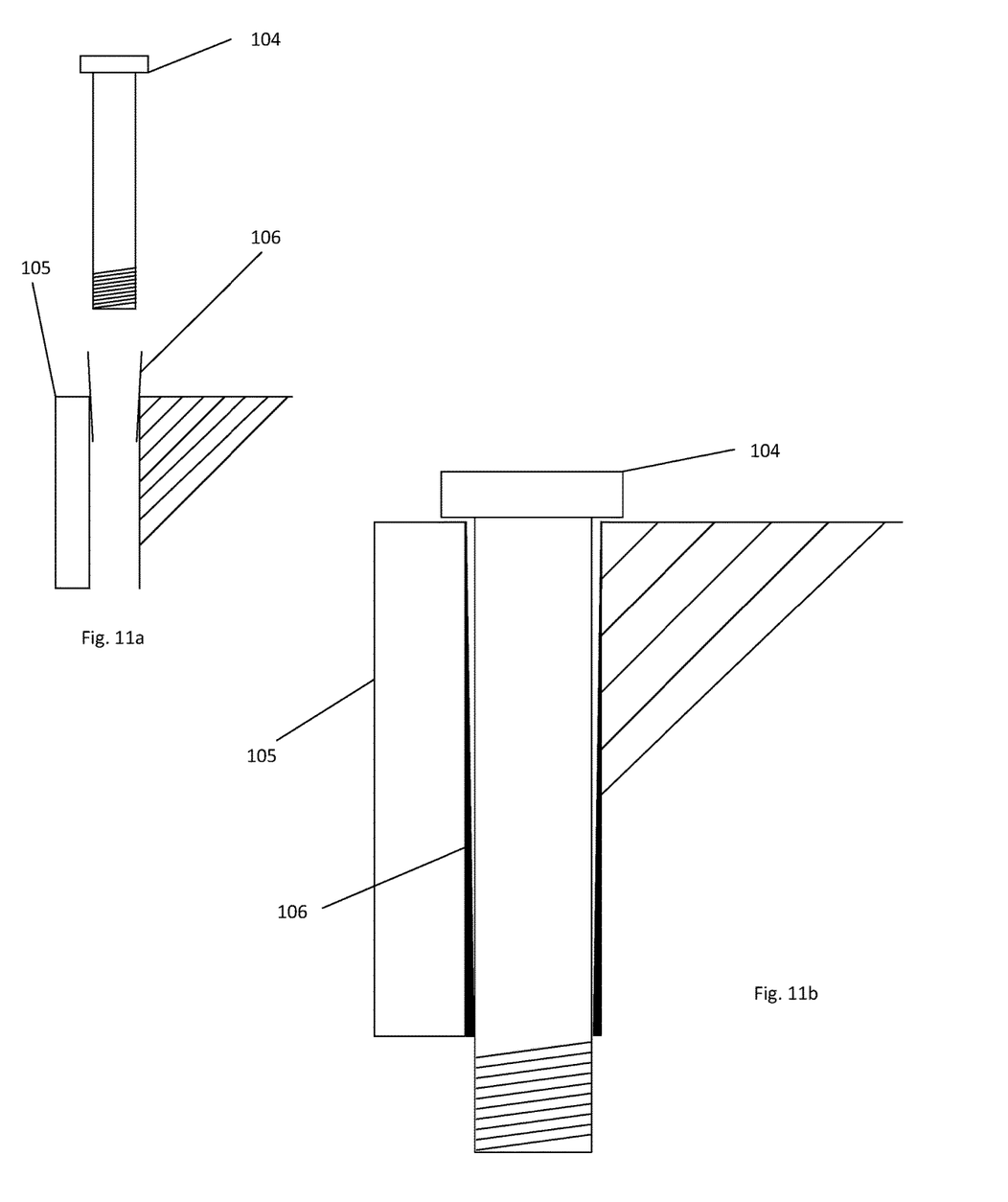
FIG. 11a depicts a cross-sectional view of an embodiment of the present device in use.
FIG. 11b depicts a cross-sectional view of the embodiment of FIG. 11a after a bolt has been tightened.

FIG. 11a depicts a cross-sectional view of an embodiment of the present device in use. In some embodiments, prior to a bolt 104 being tightened, a bushing 106 can have its original configuration. When placed in a hole, a bushing 106 can be positioned such that one end sits above the opening of a hole.

FIG. 11b depicts a cross-sectional view of the embodiment of FIG. 11a after a bolt 104 has been tightened. In such embodiments, a bushing 106 can deform under a force exerted by tightening a bolt 104. As a bolt 104 is tightened, a force can press a bushing 106 into the hole. In some embodiments, this force can be applied to a bushing 106 substantially parallel to the longitudinal axis of a bushing 106, but in other embodiments can be applied in any other known and/or convenient configuration. A bushing 106 can expand radially, longitudinally, laterally, or in any known and/or convenient configuration. In such embodiments, a bushing 106 can fill the space between a bolt 104 and a rocker arm shaft 105. This can mitigate or eliminate the motion of a rocker arm shaft 105 against a bolt and the tapping sound that creates.

Figure 12:
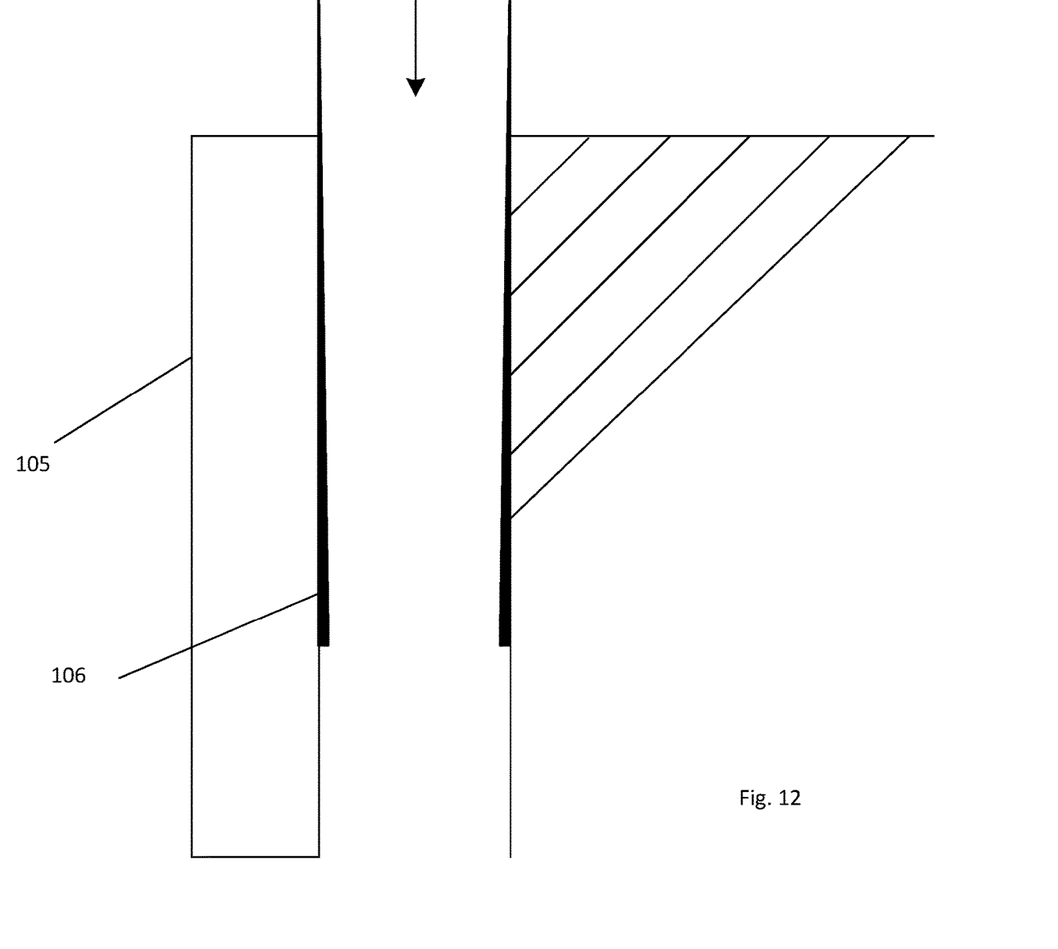
FIG. 12 depicts a cross-sectional view of another embodiment of the present device in use.

In some embodiments, the material of a bushing 106 can compress and thicken as a bushing 106 is forced into the hole by a striking, compression, or any other known and/or convenient force. As shown in FIG. 12, a bushing 106 can be larger at one end than the other. In such embodiments, one end of a bushing 106 can have and outer diameter greater than that of a hole. As a bushing 106 is pressed into a hole, the material can deform such that a bushing 106 thickens to substantially till the space between a bolt 104 and a rocker arm shaft 105.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the claims.

What is claimed:

1. An engine insert system, comprising:
   a bushing having a proximal end and a distal end, an inner surface and an outer surface, and an inner diameter and an outer diameter;
   a bolt;
   a rocker arm shaft; and
   a rocker arm support;
   wherein the outer diameter varies longitudinally;
   wherein the outer diameter and the inner diameter are selected to eliminate motion of the rocker arm shaft relative to the bolt while an engine is in operation;
   wherein a space exists between the bolt and the rocker arm shaft; and
   wherein the bolt selectively engages with the inner diameter of the bushing and applies a force to the bushing causing the bushing to deform and fill the space between the bolt and the rocker arm shaft.

2. The engine insert system of claim 1, wherein the outer diameter of the proximal end of the bushing is larger than the outer diameter of the distal end of the bushing.

3. The engine insert system of claim 2, wherein the outer surface of the bushing tapers from the proximal end to the distal end of the bushing.

4. The engine insert system of claim 3, further comprising a longitudinal slit along the length of the bushing.

5. The engine insert system of claim 4, wherein the force is applied substantially parallel to the central longitudinal axis of the bushing.

6. The engine insert system of claim 5, wherein the force is created by the tightening of the bolt.

7. An engine insert system, comprising:
   a bushing having a proximal end and a distal end, an inner surface and an outer surface, and an inner diameter and an outer diameter, and a thickness;
   a rocker arm support;
   a bolt; and
   a rocker arm shaft;
   wherein the outer diameter varies longitudinally;
   wherein the inner diameter varies longitudinally;
   wherein the outer diameter of the proximal end of the bushing is larger than the outer diameter of the distal end of the bushing;
   wherein a space exists between the bolt and the rocker arm shaft;
   wherein the bolt selectively engages with the inner diameter of the bushing and applies a force to the bushing; and
   wherein the bushing deforms to substantially fill the space between the bolt and the rocker arm shaft under the force that is applied substantially parallel to the central longitudinal axis of the bushing.

8. The engine insert system of claim 7, wherein the thickness and the outer diameter vary inversely substantially along the central longitudinal axis of the bushing.

9. The engine insert system of claim 7, further comprising a longitudinal slit along the length of the bushing.

10. The engine insert system of claim 7, wherein the inner diameter of the proximal end of the bushing is larger than the inner diameter of the distal end of the bushing.

\* \* \* \* \*